United States Patent
Inoue et al.

(10) Patent No.: US 7,695,868 B2
(45) Date of Patent: Apr. 13, 2010

(54) SODIUM ION SECONDARY BATTERY

(75) Inventors: Takao Inoue, Hyogo (JP); Motoharu Saito, Hyogo (JP); Masahisa Fujimoto, Osaka (JP); Masaharu Itaya, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 343 days.

(21) Appl. No.: 11/723,386

(22) Filed: Mar. 19, 2007

(65) Prior Publication Data

US 2007/0218361 A1  Sep. 20, 2007

(30) Foreign Application Priority Data

Mar. 20, 2006 (JP) ............................. 2006-075979
Feb. 6, 2007 (JP) ............................. 2007-026697

(51) Int. Cl.
  *H01M 4/58* (2010.01)
(52) U.S. Cl. ................. 429/231.1; 429/231.3; 429/221; 429/223; 429/224; 429/321
(58) Field of Classification Search ............ 429/231.1, 429/231.3, 221, 223, 224, 321
  See application file for complete search history.

(56) References Cited

U.S. PATENT DOCUMENTS 5,051,325 A * 9/1991 Shishikura et al. .......... 429/341
5,531,920 A   7/1996 Mao et al. ................ 252/182.1
6,511,647 B1  1/2003 Coowar
2002/0098146 A1  7/2002 Takada et al.
2004/0214086 A1 10/2004 Bruce et al.
2006/0105239 A1  5/2006 Paulsen et al.

FOREIGN PATENT DOCUMENTS

| CN | 1163015 A | 10/1997 |
| JP | 3-291863 | * 12/1991 |
| JP | 2001-328818 | 11/2001 |
| JP | 2003-151549 | 5/2003 |

OTHER PUBLICATIONS

J.-P. Parant, et al.: "Sur Quelques Nouvelles Phases de Formule $Na_xMnO_2$ ($x \leqq 1$);" *Journal of Solid State Chemistry*; vol. 3; 1971; pp. 1-11.
Chinese Office Action dated Jul. 10, 2009 (in Chinese).

* cited by examiner

*Primary Examiner*—Laura S Weiner
(74) *Attorney, Agent, or Firm*—Kratz, Quintos & Hanson, LLP

(57) ABSTRACT

The positive electrode active material of a positive electrode includes a sodium-containing transition metal oxide ($Na_aLi_bM_xO_{2\pm\alpha}$). The M includes at least two of manganese (Mn), iron (Fe), cobalt (Co), and nickel (Ni). For a negative electrode, a sodium metal or a metal that forms an alloy with sodium is used. A non-aqueous electrolyte produced by dissolving an electrolytic salt (sodium salt) in a non-aqueous solvent is used. Examples of the non-aqueous solvent may include a cyclic carbonate, a chain carbonate, esters, cyclic ethers, chain ethers, nitrites, amides and a combination thereof.

4 Claims, 9 Drawing Sheets

F I G. 1
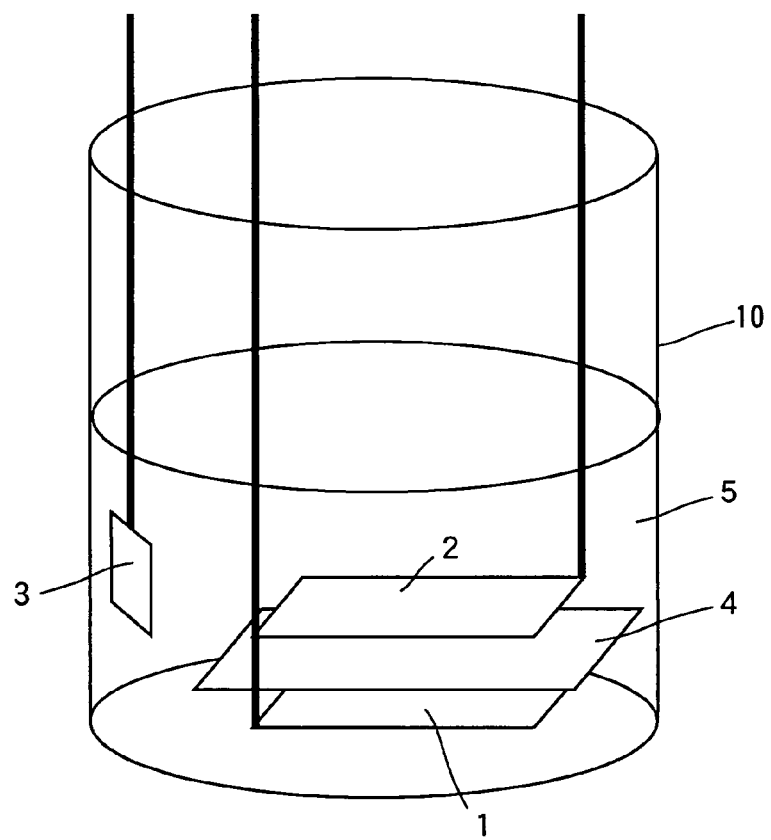

SODIUM ION SECONDARY BATTERY

BACKGROUND OF THE INVENTION

1. Field of the Invention

The present invention relates to a sodium ion secondary battery including a positive electrode, a negative electrode, and a non-aqueous electrolyte.

2. Description of the Background Art

Non-aqueous electrolyte secondary batteries have recently been in wide use as secondary batteries having high energy densities. The non-aqueous electrolyte secondary battery uses a non-aqueous electrolyte and carries out charge and discharge by allowing for example lithium ions to be transferred between its positive and negative electrodes.

Such a non-aqueous electrolyte secondary battery generally uses a lithiumtransitionmetal composite oxide having a layered structure such as lithium nickelate ($LiNiO_2$) and lithium cobaltate ($LiCoO_2$) for a positive electrode and a material capable of intercalating and deintercalating lithium such as a carbon material, a lithium metal, and a lithium alloy for a negative electrode (see for example JP 2003-151549 A).

The use of the non-aqueous electrolyte secondary battery described above results in a discharge capacity from 150 mAh/g to 180 mAh/g, a potential of about 4 V, and a theoretical capacity of about 260 mAh/g.

The non-aqueous electrolyte is produced by dissolving an electrolytic salt such as lithium tetrafluoroborate ($LiBF_4$) and lithium hexafluorophosphate ($LiPF_6$) in an organic solvent such as ethylene carbonate and diethyl carbonate.

In the conventional non-aqueous electrolyte secondary battery that uses the lithium ions as described above, an oxide of cobalt (Co) or nickel (Ni) is mainly used for its positive electrode and these materials are limited as natural resources.

If all the lithium ions are deintercalated from the lithium nickelate or the lithium cobaltate in the non-aqueous electrolyte secondary battery described above, the crystal structure of the lithium nickelate or the lithium cobaltate is destroyed. As a result, oxygen is released from the lithium nickelate or the lithium cobaltate, which may cause a safety concern. Therefore, the discharge capacity cannot be increased from the above-described level.

Manganese (Mn) available in abundance as a resource may be used in place of nickel or cobalt, but the capacity of the non-aqueous electrolyte secondary battery is halved in the case.

It is difficult to produce lithium manganate ($LiMnO_2$) having a layered structure effective in improving the mobility of lithium ions using manganese. Therefore, lithium manganate ($LiMn_2O_4$) having a spinel structure is generally used. With the $LiMn_2O_4$, if all the lithium ions are deintercalated, the state of $MnO_2$ is maintained. Since manganese is stable in a tetravalent state, it does not release oxygen and is therefore considerably safe.

The use of $LiMn_2O_4$ allows a potential of 4 V to be obtained, but a discharge capacity only from 100 mAh/g to 120 mAh/g can be obtained.

Furthermore, attempts to produce layered $LiMnO_2$ have been made but when the potential becomes about as low as 3 V and the charge and discharge cycle is repeatedly carried out, the $LiMnO_2$ is transformed into spinel $LiMn_2O_4$. It is believed that the layered $LiMnO_2$ is chemically unstable because the radius of the lithium ions is small.

SUMMARY OF THE INVENTION

It is an object of the invention to provide a sodium ion secondary battery that allows a high discharge capacity density to be stably obtained.

(1)

A sodium ion secondary battery according to one aspect of the invention includes a positive electrode made of an oxide including sodium and a transition metal, a negative electrode, and a non-aqueous electrolyte, and the transition metal includes at least two selected from the group consisting of manganese, iron, cobalt, and nickel, and the non-aqueous electrolyte includes a sodium salt.

In the sodium ion secondary battery, the positive electrode is made of an oxide including sodium and a transition metal, and charge and discharge is carried out as sodium ions are transferred between the positive electrode and the negative electrode.

In this case, the transition metal included in the oxide includes at least two selected from the group consisting of manganese, iron, cobalt, and nickel, so that the layered structure of the oxide is stably formed. In this way, sodium ions can sufficiently be intercalated and deintercalated at the positive electrode, and a high discharge capacity density can stably be obtained.

The use of sodium available in abundance as a resource allows the cost to be reduced.

Furthermore, sodium ions are separated from a solvent with energy smaller than the energy necessary to separate lithium ions or the like from a solvent. Therefore, since the non-aqueous electrolyte includes a sodium salt, the positive electrode can be restrained from being degraded during the insertion of ions. Therefore, a good cycle characteristic can be maintained.

(2)

The oxide may include $Na_aLi_bMn_xM_yO_{2\pm\alpha}$, the M may include at least one selected from the group consisting of iron, cobalt, and nickel, the a may be from 0.6 to 1.1, the b may be from 0 to 0.5, the sum of the x and the y may be from 0.9 to 1.1, and the a may be from 0 to 0.1.

In this case, the oxide includes manganese and therefore oxidation and reduction can be carried out at high potentials. Therefore, the energy density of the sodium ion secondary battery can be increased, and a good cycle characteristic can be maintained. Manganese available in abundance as a resource is inexpensive. Therefore, the energy density of the sodium ion secondary battery can be increased and a good cycle characteristic can be maintained less costly.

Since the a is not less than 0.6, sufficient sodium ions that can be intercalated and deintercalated exist and a high discharge capacity can be obtained. Furthermore, since the a is not more than 1.1, sodium oxide and sodium hydride may be prevented from being excessively produced, and therefore introduction of moisture in the sodium ion secondary battery that would otherwise be caused by the excess may be prevented. Consequently, the battery characteristics can be prevented from being degraded.

Since the sum of the x and the y is from 0.9 to 1.1, the basic skeleton of the oxide is stabilized, so that a high energy density and a good cycle characteristic can be maintained.

Since the a is from 0 to 0.1, a high energy density and a good cycle characteristic can be maintained.

(3)

The oxide may include $Na_aLi_bMn_xCo_cO_{2\pm\alpha}$, the a may be from 0.6 to 1.1, the b may be from 0 to 0.5, the x and the c may be larger than 0 and at most 1, the sum of the x and the c may be from 0.9 to 1.1, and the α may be from 0 to 0.1.

In this case, the oxide includes manganese and cobalt, the crystal structure of the oxide is more stabilized than the case of including either manganese or cobalt alone. The use of cobalt allows oxidation and reduction to be carried out at higher potentials than the case of including manganese alone. Therefore, the energy density of the sodiumion secondary battery can be increased and a good cycle characteristic can be maintained.

Since the a is not less than 0.6, sufficient sodium ions that can be intercalated and deintercalated exist, and therefore a high discharge capacity can be obtained. Furthermore, since the a is not more than 1.1, sodium oxide and sodium hydride may be prevented from being excessively produced, and therefore introduction of moisture in the sodium ion secondary battery that would otherwise be caused by the excess may be prevented. Consequently, the battery characteristics can be prevented from being degraded.

Since the sum of the x and the c is from 0.9 to 1.1, the basic skeleton of the oxide is stabilized, so that a high energy density and a good cycle characteristic can be maintained.

Since the α is from 0 to 0.1, a high energy density and a good cycle characteristic can be maintained.

(4)

The b may be larger than 0. In this case, the addition of lithium makes it easier to produce the oxide.

(5)

The non-aqueous electrolyte may include sodium hexafluorophosphate. In this case, sodium hexafluorophosphate is thermally stable. Therefore, the safety of the sodium ion secondary battery in use can be secured.

Other features, elements, characteristics, and advantages of the present invention will become more apparent from the following description of preferred embodiments of the present invention with reference to the attached drawings.

BRIEF DESCRIPTION OF THE DRAWINGS

FIG. 1 is a schematic view of a sodium ion secondary battery as a test cell according to an embodiment of the invention;

DESCRIPTION OF THE PREFERRED EMBODIMENTS

Figure 2:
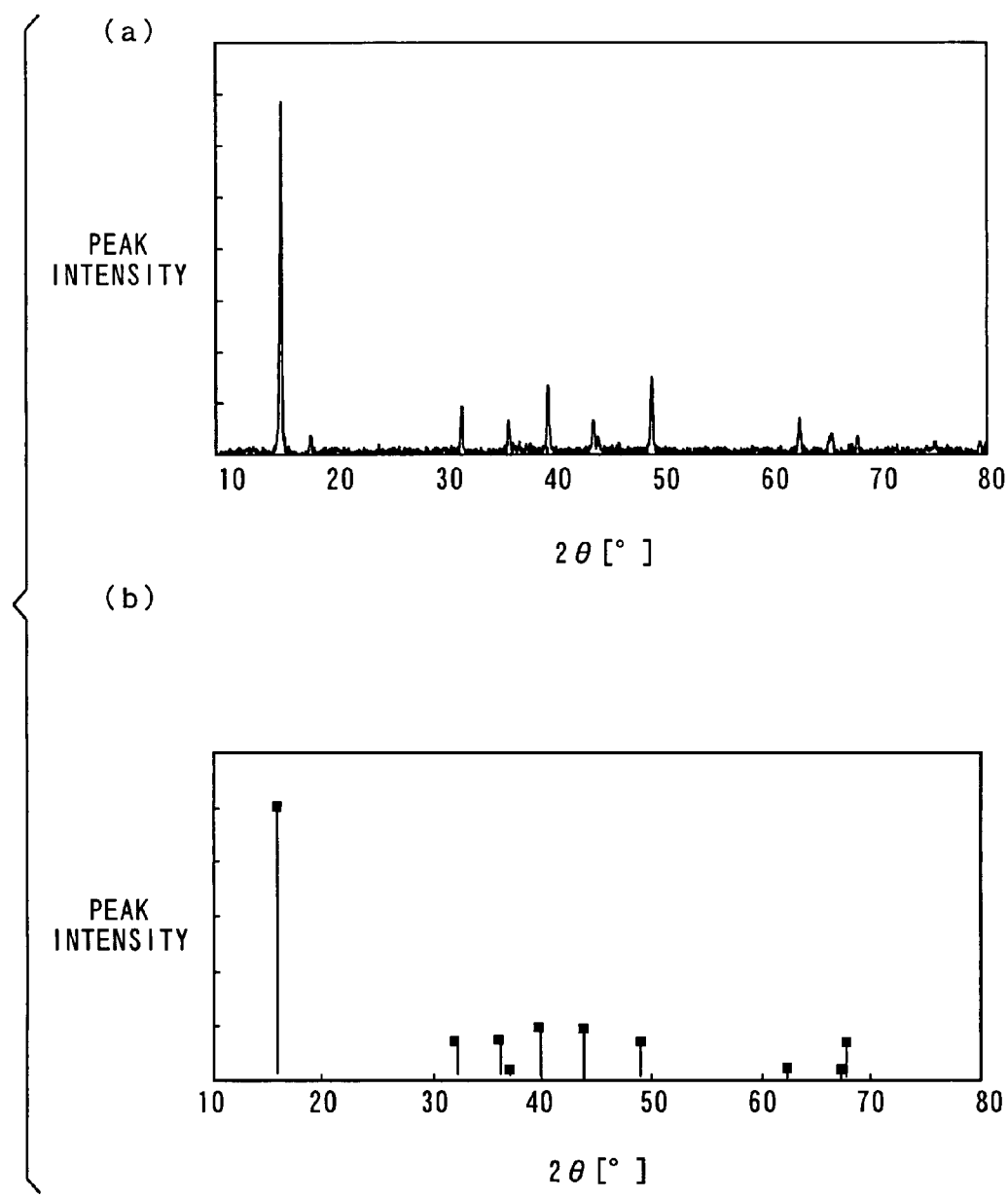
FIG. 2 is a graph showing XRD measurement results of a positive electrode active material according to Inventive Example 1.

Now, a sodium ion secondary battery according to an embodiment of the invention will be described. The sodium ion secondary battery according to the embodiment includes a positive electrode, a negative electrode, and a non-aqueous electrolyte, and charge and discharge is carried out as sodium ions are transferred between the positive electrode and the negative electrode.

Note that materials and the thicknesses and the concentrations of those materials are not limited to those in the following description and may be set as desired.

(1) Manufacture of Positive Electrode

The positive electrode active material includes a sodium-containing transition metal oxide ($Na_aLi_bM_xO_{2\pm\alpha}$). The M includes at least two of manganese (Mn), iron (Fe), cobalt (Co), and nickel (Ni).

Note that if the amount of the sodium (Na) in the sodium-containing transition metal oxide is too large, excess sodium oxide or sodium hydride that does not remain in the basic skeleton of the sodium-containing transition metal oxide is produced. Because of the sodium oxide or sodium hydride, the positive electrode active material becomes highly moisture-absorptive. As a result, a lot of moisture is introduced into the sodium ion secondary battery, and the battery characteristic is degraded accordingly.

On the other hand, if the amount of the sodium in the sodium-containing transition metal oxide is too small, the amount of sodium ions that can be intercalated and deintercalated is reduced, and therefore a high discharge capacity cannot be obtained.

For example, a theoretical capacity obtained using sodium manganate ($Na_aMnO_2$) as a positive electrode active material is about 240 mAh/g if the above a is 1, about 144 mAh/g if the a is 0.6, and about 120 mAh/g if the a is 0.5. In this way, the theoretical capacity decreases as the amount of sodium decreases.

Therefore, in order to obtain a high discharge capacity while preventing the battery characteristic from being degraded by moisture, the a in the $Na_aLi_bM_xO_{2\pm\alpha}$ is preferably from 0.6 to 1.1.

According to the embodiment, the sodium-containing transition metal oxide includes lithium. In this way, the addition of lithium makes it easier to produce an oxide. Note however that if the amount of lithium is too large as compared to sodium ions, the object of the invention to carry out charge and discharge by allowing sodium ions to be transferred between the positive electrode and the negative electrode is not fulfilled. Too much lithium increases the total amount of monovalent metals contained in the sodium-containing transition metal, so that a stable crystal structure cannot be maintained.

Therefore, the b in the $Na_aLi_bM_xO_{2\pm\alpha}$ is preferably from 0 to 0.5. Note that if an oxide can easily be produced, lithium does not have to be added.

The x in the $Na_aLi_bM_xO_{2\pm\alpha}$ is preferably from 0.9 to 1.1, more preferably 1. In this case, the basic skeleton of the sodium-containing transition metal oxide is stabilized, so that a high energy density and a good cycle characteristic can be maintained.

If the amount of oxygen contained in the sodium-containing transition metal oxide is too large, the sites where the transitionmetal (M) or the alkaline metal (Na) should be present could be occupied by oxygen. Meanwhile, if the amount of oxygen is too small, an oxygen lacking oxide results, which causes the crystal structure to have many defects. It has been experimentally known that a high energy density and a good cycle characteristic can be maintained when the α in the $Na_aLi_bM_xO_{2\pm\alpha}$ is from 0 to 0.1, and the oxygen amount preferably falls within the range.

When manganese (Mn) is contained as the M in the sodium-containing transition metal oxide ($Na_aLi_bM_xO_{2\pm\alpha}$), oxidation and reduction can be carried out at high potentials. Therefore, the energy density of the sodium ion secondary battery can be increased, and a good cycle characteristic can be maintained. Manganese available in abundance as a resource is inexpensive. Therefore, the energy density of the sodium ion secondary battery can be increased and a good cycle characteristic can be maintained less costly.

Furthermore, when manganese (Mn) and cobalt (Co) are contained as the M in the sodium-containing transition metal oxide ($Na_aLi_bM_xO_{2\pm\alpha}$), the crystal structure can be more stabilized than the case of containing either manganese or cobalt alone. The use of cobalt allows the oxidation and reduction to be carried out at even higher potentials than the case of containing manganese alone, an even more increased energy density can be achieved and a better cycle characteristic can be maintained.

Note that a material such as titanium, vanadium, chromium, copper, zinc, aluminum, zirconium, niobium, molybdenum, tantalum, tungsten, cerium, and neodymium may be added to the basic skeleton of the sodium-containing transition metal oxide.

When the positive electrode active material is produced, a conductive agent may be added. If the positive electrode active material is a conductive material, the addition of a conductive agent improves its conductivity and a good charge and discharge characteristic results. If the conductivity of the positive electrode active material is low, the addition of a conductive agent allows the electrode to function surely as the positive electrode.

The conductive agent may be any conductive material, and at least one of oxide, carbide, nitride, and a carbon material that have good conductivity in particular may be used. Examples of the oxide may include tin oxide and indium oxide. Examples of the carbide may include tungsten carbide and zirconium carbide. Examples of the nitride may include titaniumnitride and tantalum nitride.

Note that if such a conductive agent is added as described above and the added amount is not enough, the conductivity of the positive electrode cannot be improved sufficiently, while if the added amount is excessive, the ratio of the positive electrode active material contained in the positive electrode is reduced, and a high energy density cannot be obtained. Therefore, the amount of the conductive agent to be added is from 0% to 30% by weight, preferably from 0% to 20% by weight, more preferably from 0% to 10% by weight.

Examples of a binder to be added to the electrode may include at least one of polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, and carboxymethylcellulose.

If the amount of the binder to be added to the electrode is excessive, the ratio of the active material contained in the positive electrode is reduced, and therefore a high energy density cannot be obtained. Therefore, the amount of the binder is from 0% to 30% by weight, preferably from 0% to 20% by weight, more preferably from 0% to 10% by weight.

(2) Manufacture of Non-Aqueous Electrolyte

As a non-aqueous electrolyte, an electrolytic salt (sodium salt) dissolved in a non-aqueous solvent may be used.

Note that as the electrolytic salt to be dissolved in the non-aqueous solvent, a sodium salt is preferably used rather than a lithium salt for the following reasons.

In consideration of an infinite dilution state in an aqueous system, as the size of a naked ion (that is not solvated) is larger, the number of water molecules to be hydrated is smaller. More specifically, as the size of the naked ion increases, the salvation number decreases.

Therefore, it is believed that similarly in the case of a non-aqueous system, the solvation number tends to decrease as the size of the naked ions increases. In this case, the size of sodium ion ($Na^+$) is larger than the size of lithium ion ($Li^+$). It is therefore believed that a non-aqueous solution using a sodium salt as a solute has a smaller solvation number than a non-aqueous solution using a lithium salt as a solute.

When ions are inserted into the positive electrode, solvated ions are isolated from the solvent. In this case, as the salvation energy (energy necessary for isolating the solvated ions from the solvent) is smaller, the degradation of the surface of the positive electrode is restrained, which increases the cycle characteristic.

The solvation energy increases as the solvation number increases. More specifically, it is considered that the salvation energy is smaller for the case of using a sodium salt than the case of using a lithium salt, which is advantageous with respect to the cycle characteristic.

Note that $NaClO_4$ that is a peroxide is not altogether safe and is not suitable for an electrolyte for a battery, and the use of a sodium salt having a thermally stable anion such as $PF_6$ is desirable.

Examples of the non-aqueous solvent may include a cyclic carbonate, a chain carbonate, esters, cyclic ethers, chain ethers, nitrites, amides, and a combination thereof.

Examples of the cyclic carbonate may include ethylene carbonate, propylene carbonate, butylene carbonate, and any of the above having its hydrogen group partly or entirely fluorinated such as trifluoropropylene carbonate, and fluoroethylene carbonate.

Examples of the chain carbonate may include dimethyl carbonate, ethyl methyl carbonate, diethyl carbonate, methyl propyl carbonate, ethyl propyl carbonate, methyl isopropyl carbonate, and any of the above having its hydrogen group partly or entirely fluorinated.

Examples of the esters may include methyl acetate, ethyl acetate, propyl acetate, methyl propionate, ethyl propionate, and γ-butyrolactone. Examples of the cyclic ethers may include 1,3-dioxolane, 4-methyl-1,3-dioxolane, tetrahydrofuran, 2-methyl tetrahydrofuran, propylene oxide, 1,2-butylene oxide, 1,4-dioxane, 1,3,5-trioxane, furan, 2-methylfuran, 1,8-cineol, and crown ether.

Examples of the chain ethers may include 1,2-dimethoxyethane, diethyl ether, dipropyl ether, diisopropyl ether, dibutyl ether, dihexyl ether, ethyl vinyl ether, butyl vinyl ether, methylphenyl ether, ethylphenyl ether, butylphenyl ether, pentylphenyl ether, methoxytoluene, benzylethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

An example of the nitriles may include acetonitrile, and an example of the amides may include dimethylformamide.

Examples of the electrolytic salt may include $NaBF_4$, $NaPF_6$, $NaCF_3SO_3$, $NaC_4F_9SO_3$, $NaN(CF_3SO_2)_2$, $NaN(C_2F_5SO_2)_2$, $NaAsF_6$, and difluoro (oxalato) sodium borate.

Note that one of the above electrolytic salts may be used or two or more of the above may be combined for use.

(3) Constitution of Negative Electrode

Examples of a negative electrode material may include a sodium metal or a metal that forms an alloy with sodium. Examples of the metal that forms an alloy with sodium may include germanium (Ge), tin (Sn), bismuth (Bi), and indium (In).

(4) Manufacture of Sodium Ion Secondary Battery

Using the positive electrode, the negative electrode, and the non-aqueous electrolyte described above, a sodium ion secondary battery is manufactured.

FIG. 1 is a schematic view for use in illustrating the sodium ion secondary battery as a test cell according to the embodiment.

As shown in FIG. 1, in an inert atmosphere, a lead is attached to the above-described positive electrode 1, and a lead is attached to the above-described negative electrode 2 made for example of a sodium metal.

Then, a separator 4 is inserted between the positive electrode 1 and the negative electrode 2, and the positive electrode 1, the negative electrode 2, and a reference electrode 3 made for example of a sodium metal are provided inside a cell container 10. A non-aqueous electrolyte 5 is injected into the cell container 10, and the non-aqueous electrolytic secondary battery as a test cell is manufactured.

Note that in the sodium ion secondary battery according to the embodiment, the non-aqueous electrolyte 5 is decomposed only a little when charge is carried out until the potential of the positive electrode 1 reaches for example 4.75 V with respect to the reference electrode 3, and a good cycle characteristic can be obtained. This is probably because a stable coating film forms on the surface of the positive electrode active material by a reaction between sodium ions with the non-aqueous electrolyte 5.

(5) Effects of the Embodiment

According to the embodiment, sodium ions are transferred between the positive electrode and the negative electrode to carry out charge and discharge. For the positive electrode, a sodium-containing transition metal oxide ($Na_aLi_bM_xO_{2\pm\alpha}$) including at least two of manganese, iron, cobalt, and nickel as the M is used as a positive electrode active material.

In this way, the layered structure of the sodium-containing transition metal oxide is stably formed at the positive electrode, so that sodium ions are sufficiently intercalated and deintercalated. Therefore, a high discharge capacity density can stably be obtained.

The use of manganese and cobalt as the M in particular allows an even higher discharge capacity density to be obtained.

The use of sodium available in abundance as a resource allows the cost to be reduced.

According to the embodiment, sodium hexafluorophosphate ($NaPF_6$) for example is used as an electrolytic salt for a non-aqueous electrolyte. The sodium hexafluorophosphate is more thermally stable than other peroxides such as sodium perchlorate ($NaClO_4$). Therefore, the safety of the sodium ion secondary battery is secured.

EXAMPLES (A) Inventive Examples 1 to 3 and Comparative Examples 1 and 2

In Inventive Examples 1 to 3 and Comparative Examples 1 and 2, non-aqueous electrolyte secondary batteries were produced as test cells using positive electrode active materials of various compositions and examined for their charge and discharge characteristics.

(a) Inventive Example 1

(a-1) Manufacture of Positive Electrode Active Material

As starting materials for a positive electrode active material, sodium carbonate ($Na_2CO_3$), manganese oxide ($Mn_2O_3$) and cobalt oxide ($Co_3O_4$) were used.

The sodium carbonate ($Na_2CO_3$), manganese oxide ($Mn_2O_3$) and cobalt oxide ($Co_3O_4$) were mixed in a mole ratio of 2.1:1.5:1. In this case, the composition ratio of the sodium (Na), the manganese (Mn) and the cobalt (Co) was Na:Mn:Co=0.7:0.5:0.5.

The positive electrode active material obtained as powder by mixing the above-described materials was molded into pellets. Thereafter, the positive electrode active material was subjected to preliminary firing for 10 hours in an air at 700° C. and then main firing for 20 hours in an air at 800° C.

(a-2) XRD Measurement of Positive Electrode Active Material

Then, the positive electrode active material obtained by the main firing was measured using an XRD (X-ray diffractometer).

FIG. 2(a) shows the result of measurement of the positive electrode active material obtained by the main firing. FIG. 2(b) shows the X-ray diffraction data of sodium manganate ($Na_{0.7}MnO_{2.05}$) with card No. 270751 whose crystal system (structure) is a hexagonal system in the X-ray diffraction data in JCPDS (Joint Committee on Powder Diffraction Standards) that has X-ray diffraction data of about 6000 kinds of organic and inorganic compounds. Note that the XRD measurement was carried out using copper (Cu) as an X-ray source, with a voltage at 40 kV and a current at 40 mA, and at a scanning speed of 5°/min for the range of 2θ (10° to 80°).

It was found as the result of XRD measurement shown in FIG. 2 that the positive electrode active material obtained by the main firing had a hexagonal system crystal structure the same as that of $Na_{0.7}MnO_{2.05}$.

(a-3) Manufacture of Positive Electrode and Negative Electrode

Acetylene black was used as a conductive agent and polyvinylidene fluoride was used as a binder. Note that the polyvinylidene fluoride was used as it was dissolved in an N-methyl-2-pyrrolidone solution in a ratio of 10% by weight. The materials were mixed so that the weight ratio of the positive electrode active material, the acetylene black, and the polyvinylidene fluoride was 80:10:10, and a positive electrode slurry was produced.

Then, the produced slurry was applied on a positive electrode collector made of an aluminum foil by the doctor blade method, dried, and then rolled using a roller, so that apositive electrode active material layer was formed. A collector tab of aluminum was attached on a region of the positive electrode collector where the positive electrode active material layer was not formed. Then, drying at 110° C. in a vacuum was carried out, followed by molding to produce a positive electrode 1 (working electrode).

As odium metal was used for an egative electrode 2 (counter electrode) and a reference electrode 3.

(a-4) Manufacture of Non-Aqueous Electrolyte

Sodium hexafluorophosphate ($NaPF_6$) as an electrolytic salt was added in a concentration of 1 mol/l to a non-aqueous solvent obtained by mixing ethylene carbonate and diethyl carbonate in a volume ratio of 30:70 and the resultant mixture was used as a non-aqueous electrolyte 5.

Using the positive electrode 1, the negative electrode 2, the reference electrode 3, and the non-aqueous electrolyte 5 described above, a sodium ion secondary battery as a test cell was manufactured according to the embodiment (FIG. 1).

(a-5) Charge and Discharge Tests

In the manufactured sodium ion secondary battery, the cycle of charging until the potential of the positive electrode 1 reached 4.8 V with respect to the reference electrode 3 with a constant current of 0.4 mA, followed by discharge until the potential reaches 1.5 V with a constant current of 0.4 mA was carried out twice. The result is given in FIG. 3.

Figure 3:
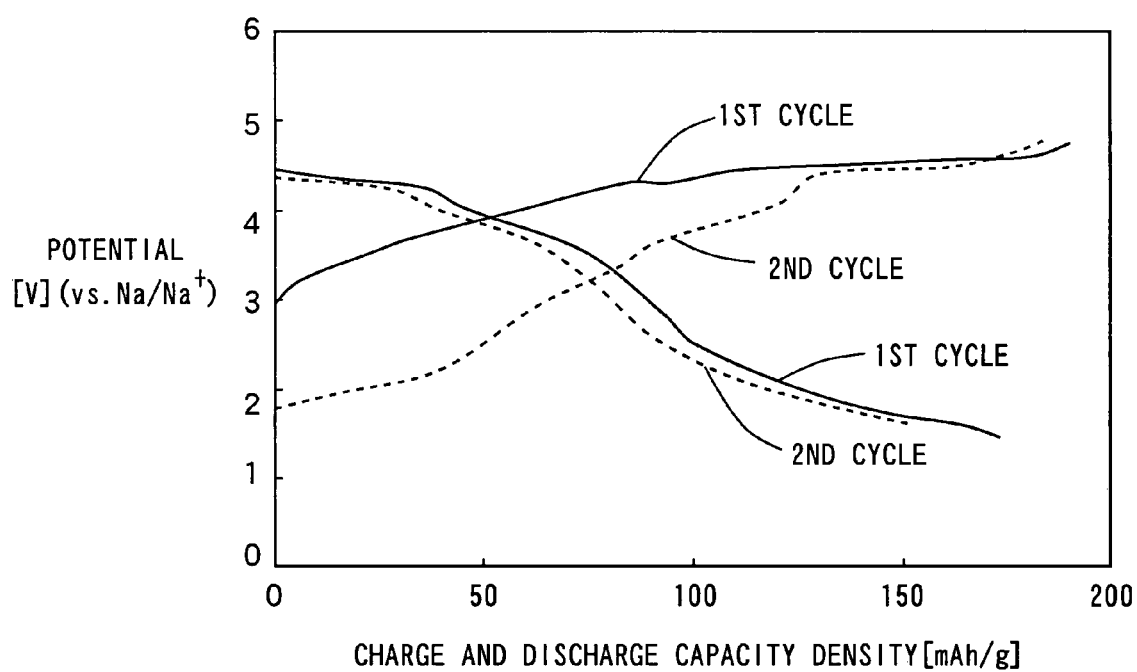
FIG. 3 is a graph showing the charge and discharge characteristic of a sodium ion secondary battery according to Inventive Example 1.

As can be understood from FIG. 3, in the sodiumion secondary battery according to Inventive Example 1, a discharge capacity density of 173 mAh/g was obtained for the first cycle. For the second cycle, a discharge capacity density of at least 150 mAh/g was obtained.

It was therefore found that in the sodium ion secondary battery according to Inventive Example 1, reversible charge and discharge could be carried out and a high discharge capacity density could be obtained.

(b) Inventive Example 2

(b-1) Manufacture of Positive Electrode Active Material

As starting materials for a positive electrode active material, sodium carbonate ($Na_2CO_3$), lithium carbonate ($Li_2CO_3$), manganese oxide ($Mn_2O_3$) and cobalt oxide ($Co_3O_4$) were used.

The sodium carbonate ($Na_2CO_3$), the lithium carbonate ($Li_2CO_3$), the manganese oxide ($Mn_2O_3$) and the cobalt oxide ($Co_3O_4$) were mixed in a mole ratio of 2.1:0.3:1.5:1. In this case, the composition ratio of the sodium (Na), the lithium (Li), the manganese (Mn), and the cobalt (Co), Na:Li:Mn:Co=0.7:0.1:0.5:0.5.

A positive electrode active material obtained as powder by mixing the above-described materials was molded into pellets. Thereafter, the positive electrode active material was subjected to preliminary firing for 10 hours in an air at 700° C. and then main firing for 20 hours in an air at 800° C.

(b-2) XRD Measurement of Positive Electrode Active Material

The positive electrode active material obtained by the main firing was measured by an XRD (X-ray diffractometer) similarly to Inventive Example 1.

Figure 4:
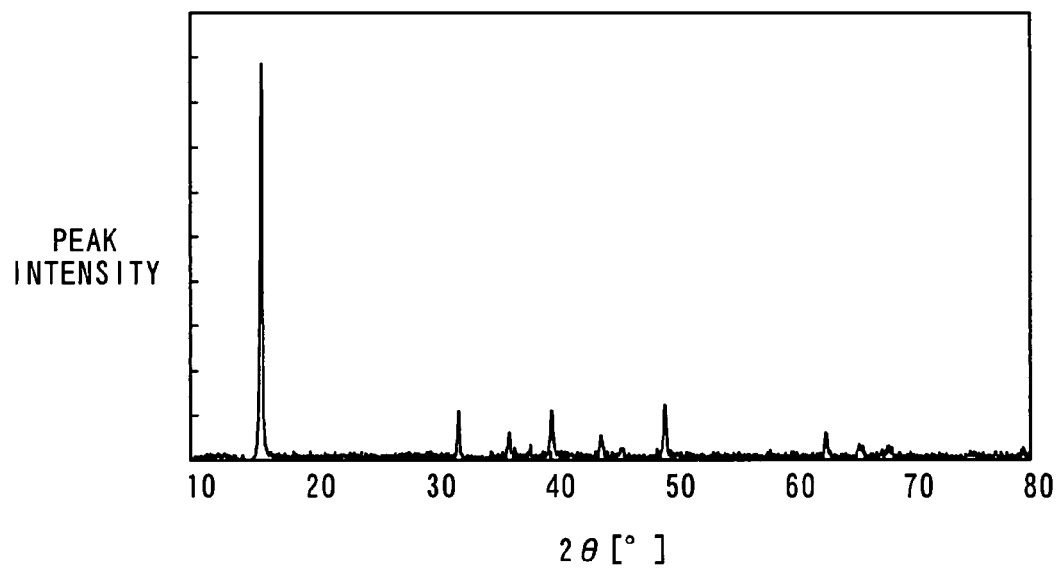
FIG. 4 is a graph showing XRD measurement results of a positive electrode active material according to Inventive Example 2.

FIG. 4 is a graph representing the XRD measurement result of the positive electrode active material.

As can be understood from the result of XRD measurement in FIG. 4, the positive electrode active material obtained by the main firing had a hexagonal crystal system the same as that of the sodium manganate ($Na_{0.7}MnO_{2.05}$) shown in FIG. 2(*b*).

(b-3) Manufacture of Sodium Ion Secondary Battery

A positive electrode 1 was produced in the same manner as that of Inventive Example 1 except that the positive electrode active material described above was used. Similarly to Inventive Example 1, a negative electrode 2, a reference electrode 3, and a non-aqueous electrolyte 5 were produced and a sodium ion secondary battery was produced as a test cell using them.

(b-4) Charge and discharge Tests

In the manufactured sodium ion secondary battery, the cycle of charging until the potential of the positive electrode 1 reached 4.6 V with respect to the reference electrode 3 with a constant current of 0.4 mA, followed by discharge until the potential reached 1.5 V with a constant current of 0.4 mA was carried out twice. The result is given in FIG. 5.

Figure 5:
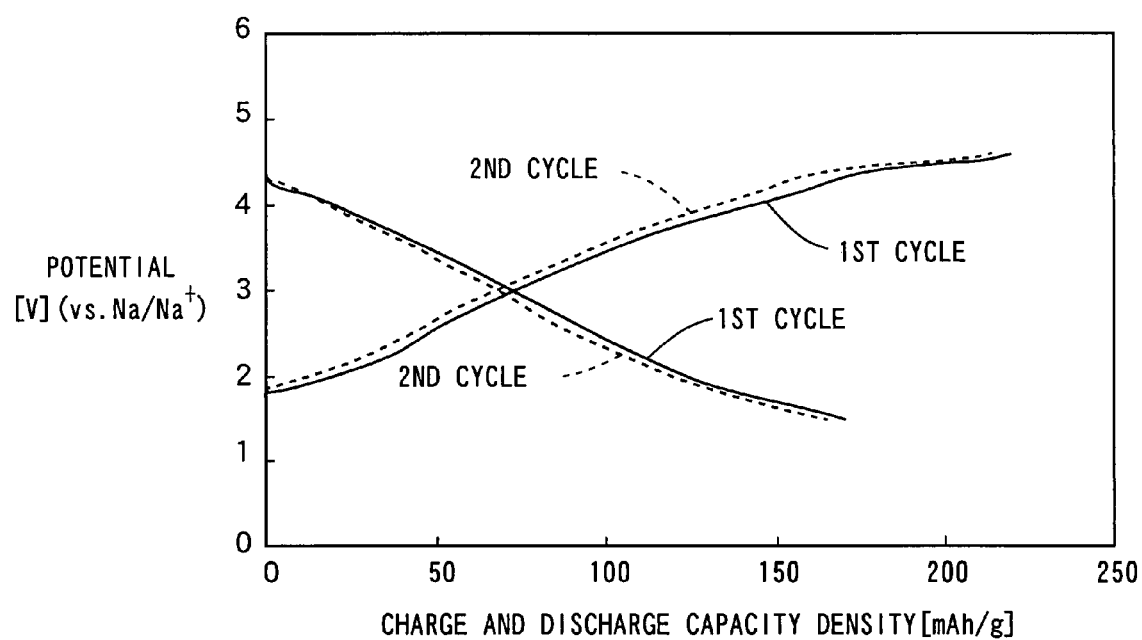
FIG. 5 is a graph showing the charge and discharge characteristic of a sodium ion secondary battery according to Inventive Example 2.

As can be understood from FIG. 5, in the sodium ion secondary battery according to Inventive Example 2, a discharge capacity density of 169 mAh/g was obtained for the first cycle. For the second cycle, a discharge capacity density of at least 150 mAh/g was obtained.

It was therefore found that in the sodium ion secondary battery according to Inventive Example 2, reversible charge and discharge could be carried out and a high discharge capacity density could be obtained.

(c) Inventive Example 3

(c-1) Manufacture of Positive Electrode Active Material

Similarly to Inventive Example 2 described above, sodium carbonate ($Na_2CO_3$), lithium carbonate ($Li_2CO_3$), manganese oxide ($Mn_2O_3$), and cobalt oxide ($Co_3O_4$) were used as starting materials for a positive electrode active material.

The sodium carbonate ($Na_2CO_3$), the lithium carbonate ($Li_2CO_3$), the manganese oxide ($Mn_2O_3$), and the cobalt oxide ($Co_3O_4$) were mixed in a mole ratio of 2.1:0.6:1.5:1. In this case, the composition ratio of the sodium (Na), the lithium (Li), the manganese (Mn), and the cobalt (Co), Na:Li:Mn:Co=0.7:0.2:0.5:0.5.

A positive electrode active material obtained as powder by mixing the above-described materials was molded into pellets. Thereafter, the positive electrode active material was subjected to preliminary firing for 10 hours in an air at 700° C. and then main firing for 20 hours in an air at 800° C.

(c-2) XRD Measurement of Positive Electrode Active Material

Then, the positive electrode active material obtained by the main firing was measured by an XRD (X-ray diffractometer) similarly to Inventive Example 1.

Figure 6:
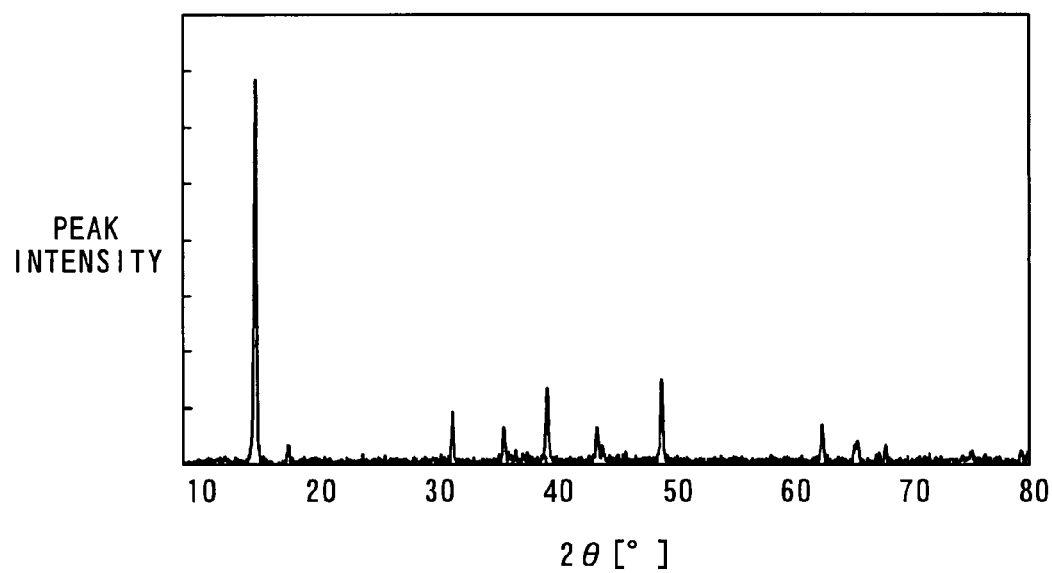
FIG. 6 is a graph showing XRD measurement results of a positive electrode active material according to Inventive Example 3.

FIG. 6 is a graph showing the result of XRD measurement of the positive electrode active material.

As can be understood from the result of the XRD measurement in FIG. 6, the positive electrode active material obtained by the main firing had a hexagonal crystal system the same as that of the sodium manganate ($Na_{0.7}MnO_{2.05}$) shown in FIG. 2(*b*).

(c-3) Manufacture of Sodium Ion Secondary Battery

Apositive electrode 1 was produced similarly to Inventive Example 1 except that the above-described positive electrode active material was used. Similarly to Inventive Example 1, a negative electrode 2, a reference electrode 3, and a non-aqueous electrolyte 5 were produced, and a sodium ion secondary battery as a test cell was produced using them.

(c-4) Charge and Discharge Tests

In the produced sodium ion secondary battery, charge was carried out with a constant current of 0.4 mA until the potential of the positive electrode 1 with respect to the reference electrode 3 reached 4.6 V, followed by discharge until the potential reached 1.5 V with a constant current of 0.4 mA. The result is given in FIG. 7.

Figure 7:
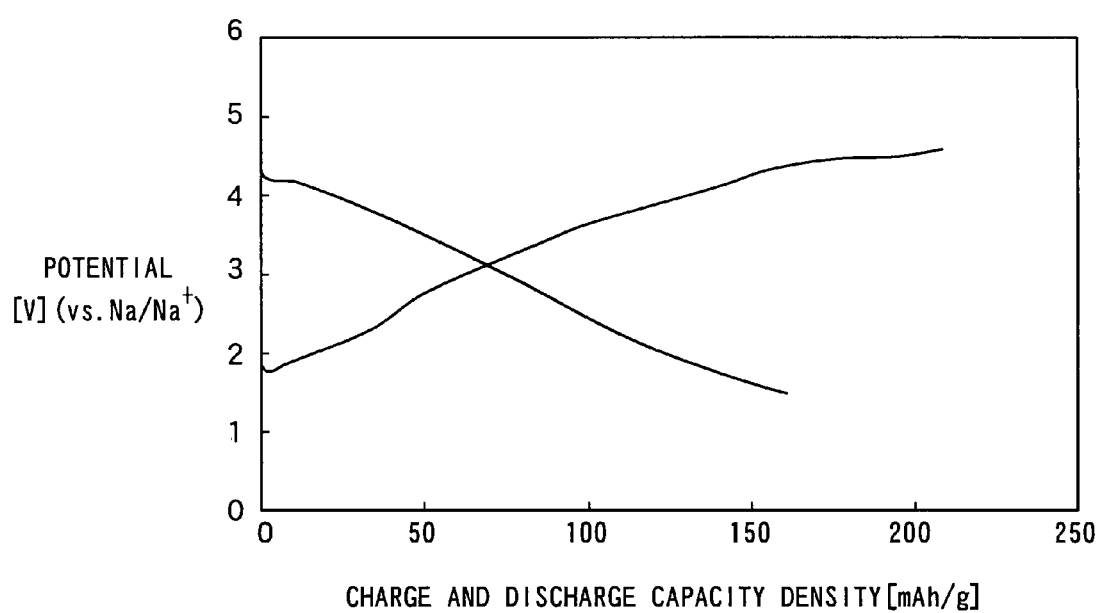
FIG. 7 is a graph showing the charge and discharge characteristic of a sodium ion secondary battery according to Inventive Example 3.

As can be understood from FIG. 7, in the sodiumion secondary battery according to Inventive Example 3, a discharge capacity density of 160 mAh/g was obtained.

(d) Comparative Example 1

(d-1) Manufacture of Positive Electrode Active Material

As starting materials for a positive electrode active material, sodium carbonate ($Na_2CO_3$) and cobalt oxide ($Co_3O_4$) were used.

The sodium carbonate ($Na_2CO_3$) and the cobalt oxide ($Co_3O_4$) were mixed in a mole ratio of 2.1:2. In this case, the composition ratio of the sodium (Na) and the cobalt (Co), Na:Co=0.7:1.

A positive electrode active material obtained as powder by mixing the above-described materials was molded into pellets. Thereafter, the positive electrode active material was subjected to preliminary firing for 10 hours in an air at 700° C. and main firing for 20 hours in an air at 800° C.

(d-2) Manufacture of Sodium Ion Secondary Battery

A positive electrode 1 was produced similarly to Inventive Example 1 except that the above-described positive electrode active material was used. Similarly to Inventive Example 1, a negative electrode 2, a reference electrode 3, and a non-aqueous electrolyte 5 were produced, and a sodium ion secondary battery as a test cell was produced using them.

(d-3) Charge and Discharge Tests

In the produced sodium ion secondary battery, charge was carried out with a constant current of 0.4 mA until the potential of the positive electrode 1 with respect to the reference electrode 3 reached 4.5 V, followed by discharge until the potential reached 2.3 V with a constant current of 0.4 mA. The result is given in FIG. 8.

Figure 8:
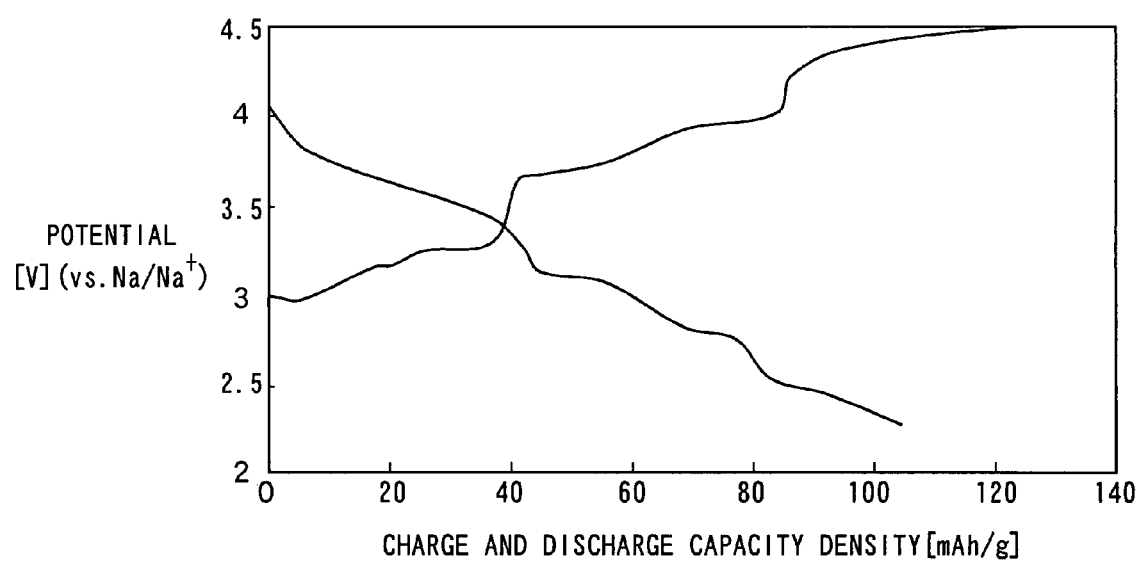
FIG. 8 is a graph showing the charge and discharge characteristic of a sodium ion secondary battery according to Comparative Example 1.

As can be understood from FIG. 8, in the sodiumion secondary battery according to Comparative Example 1, a discharge capacity density of 104 mAh/g was obtained. While the charge and discharge curves of Inventive Examples 1 to 3 were on gradual inclinations, the charge and discharge curve of Comparative Example 1 had a plurality of plateaus.

(e) Comparative Example 2

(e-1) Manufacture of Positive Electrode Active Material

As starting materials for a positive electrode active material, sodium carbonate ($Na_2CO_3$) and manganese oxide ($Mn_2O_3$) were used.

The sodium carbonate ($Na_2CO_3$) and the manganese oxide ($Mn_2O_3$) were mixed in a mole ratio of 0.7:1. In this case, the composition ratio of the sodium (Na) and the manganese (Mn), Na:Mn=0.7:1.

The positive electrode active material obtained as powder by mixing the above-described materials was molded into pellets. Thereafter, the positive electrode active material was subjected to preliminary firing for 10 hours in an air at 700° C. and main firing for 20 hours in an air at 800° C.

(e-2) Manufacture of Sodium Ion Secondary Battery

A positive electrode 1 was produced similarly to Inventive Example 1 except that the above-described positive electrode active material was used. Similarly to Inventive Example 1, a negative electrode 2, a reference electrode 3, and a non-aqueous electrolyte 5 were produced, and a sodium ion secondary battery as a test cell was produced using them.

(e-3) Charge and Discharge Tests

In the produced sodium ion secondary battery, charge was carried out with a constant current of 0.4 mA until the potential of the positive electrode 1 with respect to the reference electrode 3 reached 4.5 V, followed by discharge until the potential reached 1.5 V with a constant current of 0.4 mA. The result is given in FIG. 9.

Figure 9:
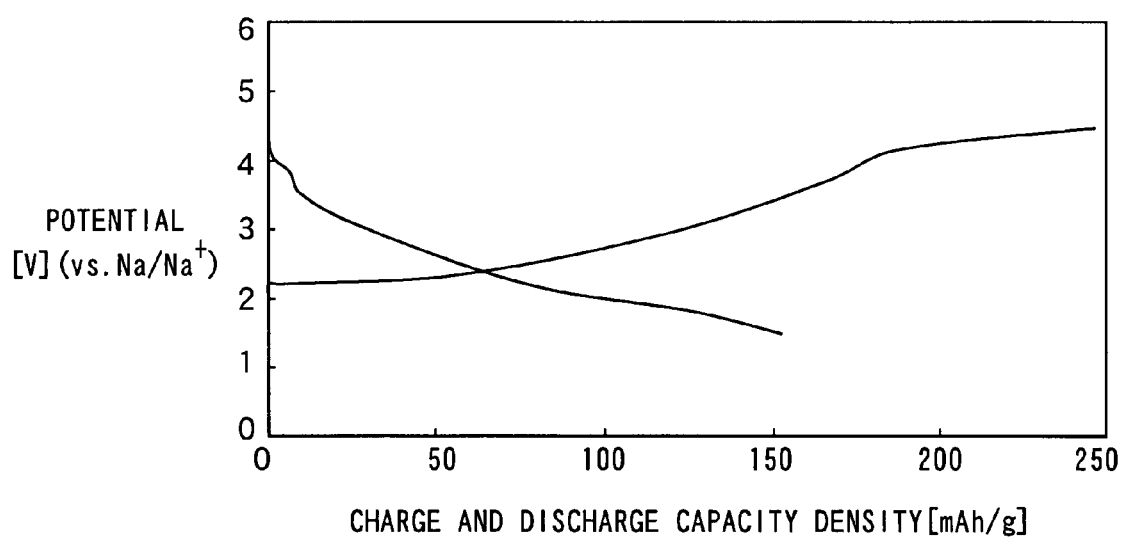
FIG. 9 is a graph showing the charge and discharge characteristic of a sodium ion secondary battery according to Comparative Example 2.

As can be understood from FIG. 9, in the sodiumion secondary battery according to Comparative Example 2, a discharge capacity density of 153 mAh/g was obtained. In Comparative Example 2, the average discharge potential was lower than those of Inventive Examples 1 to 3.

(f) Evaluation in Inventive Examples 1 to 3 and Comparative Examples 1 and 2

It was found that the use of the sodium containing transition metal oxide ($Na_aLi_bM_xO_{2\pm\alpha}$) as a positive electrode active material allowed a high discharge capacity density to be obtained. It was also found that in Inventive Examples 1 to 3 that used manganese and cobalt as the above M, higher discharge capacity densities were obtained than those in Comparative Examples 1 and 2 that used either manganese or cobalt alone.

It was found that in Inventive Example 1 without lithium (when b=0 in the $Na_aLi_bM_xO_{2\pm\alpha}$), a sufficient effect was obtained.

(B) Inventive Example 4 and Comparative Example 3

Inventive Example 4 and Comparative Example 3 were examined for their charge and discharge characteristics when a sodium salt and a lithium salt were added to their non-aqueous electrolytes.

(g) Inventive Example 4

(g-1) Manufacture of Positive Electrode Active Material

As starting materials for a positive electrode active material, sodium carbonate ($Na_2CO_3$), lithium carbonate ($Li_2CO_3$), manganese oxide ($Mn_2O_3$) and cobalt oxide ($Co_3O_4$) were used.

The sodium carbonate ($Na_2CO_3$), the lithium carbonate ($Li_2CO_3$), the manganese oxide ($Mn_2O_3$) and the cobalt oxide ($Co_3O_4$) were mixed in a mole ratio of 2.1:0.3:1.5:1. In this case, the composition ratio of the sodium (Na), the lithium (Li), the manganese (Mn), and the cobalt (Co) was Na:Li:Mn:Co=0.7:0.1:0.5:0.5.

The positive electrode active material obtained as powder by mixing the above-described materials was molded into pellets. Thereafter, the positive electrode active material was subjected to preliminary firing for 10 hours in an air at 700° C. and main firing for 20 hours in an air at 800° C.

(g-2) Manufacture of Positive Electrode and Negative Electrode

Acetylene black was used as a conductive agent, and polyvinylidene fluoride was used as a binder. Note that the polyvinylidene fluoride was used as it was dissolved in an N-methyl-2-pyrrolidone solution in a ratio of 10% by weight. The materials were mixed so that the weight ratio of the positive electrode active material, the acetylene black, and the polyvinylidene fluoride was 90:5:5, and a positive electrode slurry was produced.

Then, the produced slurry was applied on a positive electrode collector made of an aluminum foil by the doctor blade method, dried, and then rolled using a roller, so that a positive electrode active material layer was formed. A collector tab of aluminum was attached on a region of the positive electrode collector where the positive electrode active material layer was not formed. Thereafter, a positive electrode 1 (working electrode) was obtained by drying in a vacuum at 110° C., followed by molding.

A sodium metal was used for the negative electrode (counter electrode) 2 and the reference electrode 3.

(g-3) Manufacture of Non-Aqueous Electrolyte

The non-aqueous electrolyte 5 was obtained by adding sodium hexafluorophosphate ($NaPF_6$) as an electrolytic salt in a concentration of 1 mol/l to a non-aqueous solvent produced by mixing ethylene carbonate and diethyl carbonate in a volume ratio of 30:70.

Using the positive electrode 1, the negative electrode 2, the reference electrode 3, and the non-aqueous electrolyte 5, a sodium ion secondary battery as a test cell was produced based on the above-described embodiment (FIG. 1).

(g-4) Charge and Discharge Tests

In the sodium ion secondary battery, the cycle of charging with a constant current of 0.4 mA until the potential of the positive electrode 1 with respect to the reference electrode 3 reached 4.67 V, followed by discharge with a constant current of 0.4 mA (0.05 It) until the potential reached 1.67 V was carried out three times.

As the result, a discharge capacity density of 167 mAh/g was obtained for the first cycle, and a discharge capacity density of 165 mAh/g was obtained for the third cycle. Therefore, the capacity maintaining ratio after the third cycle was 98.8%.

(h) Comparative Example 3

(h-1) Manufacture of Lithium Ion Secondary Battery

A positive electrode 1 was produced similarly to Inventive Example 4. The non-aqueous electrolyte 5 was obtained by adding lithium hexafluorophosphate ($LiPF_6$) in a concentration of 1 mol/l to a non-aqueous solvent produced by mixing ethylene carbonate and diethyl carbonate in a volume ratio of 30:70. A lithium metal was used for the negative electrode 2 and the reference electrode 3.

Using the positive electrode 1, the negative electrode 2, the reference electrode 3, and the non-aqueous electrolyte 5, a lithium ion secondary battery as a test cell was produced.

(h-2) Charge and Discharge Tests

In the produced lithium ion secondary battery, the cycle of charging with a constant current of 0.475 mA until the potential of the positive electrode 1 with respect to the reference electrode 3 reached 5.0 V, followed by discharge with a constant current of 0.475 mA (0.05 It) until the potential reached 2.0 V was carried out three times.

As a result, a discharge capacity density of 220 mAh/g was obtained for the first cycle, and a discharge capacity density of 205 mAh/g was obtained for the third cycle. In this way, the capacity maintaining ratio after the third cycle was 93.2%.

(i) Evaluation in Inventive Example 4 and Comparative Example 3

It was found that when the non-aqueous electrolyte included a sodium salt such as sodium hexafluorophosphate, the capacity maintaining ratio was higher than the case of including a lithium salt such as lithium hexafluorophosphate.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A sodium ion secondary battery, comprising a positive electrode made of an oxide including $Na_aLi_bMn_xM_yO_{2\pm\alpha}$, wherein said M includes at least one selected from the group consisting of iron, cobalt, and nickel, said a is from 0.6 to 1.1, said b is from 0 to 0.5, the sum of said x and said y is from 0.9 to 1.1, and x is larger than 0, y is larger than 0, and said α is from 0 to 0.1, a negative electrode, and a non-aqueous electrolyte, said non-aqueous electrolyte including a sodium salt.

2. The sodium ion secondary battery according to claim 1, wherein said oxide includes $Na_aLi_bMn_xCo_cO_{2\pm\alpha}$, said a is from 0.6 to 1.1, said b is from 0 to 0.5, said x and said c are larger than 0 and at most 1, the sum of said x and said c is from 0.9 to 1.1, and said α is from 0 to 0.1.

3. The sodium ion secondary battery according to claim 1, wherein said b is larger than 0.

4. The sodium ion secondary battery according to claim 1, wherein said non-aqueous electrolyte including a sodium salt contains a sodium hexafluorophosphate.

* * * * *